United States Patent [19]

Van Roosmalen

[11] 3,870,002

[45] Mar. 11, 1975

[54] TELEVISION CAMERA TUBE WITH THREE ELECTRODE FOCUSING LENS

[75] Inventor: Johannes H. T. Van Roosmalen, Emmasingel, Eindhoven, Netherlands

[73] Assignee: U.S. Phillips Corporation, New York, N.Y.

[22] Filed: Mar. 2, 1973

[21] Appl. No.: 337,441

Related U.S. Application Data

[63] Continuation of Ser. No. 176,016, Aug. 30, 1971, abandoned.

[30] Foreign Application Priority Data

Sept. 4, 1970 Netherlands ........................ 7013099

[52] U.S. Cl. ................................. 313/389, 313/449
[51] Int. Cl. ... H01j 31/38, H01j 29/56, H01j 29/58
[58] Field of Search ............................ 313/86, 65 A

[56] References Cited

UNITED STATES PATENTS 2,732,511 1/1956 Dichter ............................ 313/86 X
2,984,759 5/1961 Vine ................................ 313/65 A
3,036,238 5/1962 Stone et al. ................. 313/82 BF X

*Primary Examiner*—Robert Segal
*Attorney, Agent, or Firm*—Frank R. Trifari; Carl P. Steinhauser

[57] ABSTRACT

A television camera tube having an electron gun, a focusing lens and a photoconductive layer. The focusing lens comprises three electrodes, the first of which forms one assembly with the anode. The first and the last electrodes widen in the direction of the central electrode. The first and the last electrodes preferably comprise apertures which limit the cross-section of the electron beam. The aperture in the first electrode is so small as to serve as an object to be reproduced by the focusing lens. In a device having such a television camera tube the voltage at the last electrode preferably is at least four times as large as the voltage at the first electrode.

1 Claim, 2 Drawing Figures

TELEVISION CAMERA TUBE WITH THREE ELECTRODE FOCUSING LENS

This is a continuation of application Ser. No. 176,016, filed 8-30-71, now abandoned.

The invention relates to a television camera tube having, aligned along an axis, an electron gun having a cathode and an anode provided with an aperture for producing an electron beam and 2 focusing lens for focusing the electron beam on a photoconductive layer which is provided on a signal plate, on which photoconductive layer a potential distribution is formed by projecting on it an optical image, said signal plate supplying electric signals corresponding to said optical image by the scanning of the photoconductive layer by the electron beam, said focusing lens comprising a first electrode, a second electrode being present between the first electrode and the third electrode, said anode forming part of the first electrode.

The invention also relates to a device having such a television camera tube.

The said potential distribution, sometimes termed potential picture, is formed in that the photoconductive layer may be considered to be composed of a large number of picture elements. Each picture element may be considered as a capacitor to which a current source is connected in parallel the current strength of which is substantially proportional to the light intensity on the picture element. The charge of each capacitor thus increases linearly with time when the light intensity is constant. As a result of the scanning, the electron beam passes each picture element periodically and then discharges the capacitor, that is to say that the voltage across each picture element is periodically reduced to approximately zero. The quantity of charge which is periodically necessary to discharge a capacitor is proportional to the light intensity on the relevant picture element. The associated current flows via the signal plate which all the picture elements have in common, through a signal resistor, as a result of which a voltage is formed across the signal resistor which as a function of time represents the light intensity of the optical picture as a function of the place. A television camera tube having the described effect is generally referred to as a vidicon.

It is of importance that a television camera tube of the above-described type should be as short as possible. In particular for portable television cameras and for colour television cameras which have several camera tubes, it is necessary to use a television camera tube which is as short as possible. The article "An experimental light-weight colour television camera", in Philips Technical Review, vol. 29, 1968, nr. 11, describes a television camera tube of the above type. In said television camera tube, the electron beam which is produced by an electron gun having a cathode, a grid and an anode, is focused by the electric field between said electrodes in a so-called cross-over approximately at the area of the anode. The apertures in the grid and the anode are simple cylindrical apertures and the anode forms one assembly with the first electrode of the focusing lens and is at a voltage of 300 volt. The said cross-over is reproduced on the photoconductive layer by the focusing lens. The focusing lens is a three-electrode-lens, the first electrode and the last electrode of which have the same potentials and the central electrode of which has a different potential. The three electrodes of the focusing lens are mainly cylindrical and are rather long which results from the electron optical properties of said shape of lens and the potentials used. Although the said television camera tube has rather small dimensions it has proved necessary to have another shorter tube available.

It is the object of the invention to provide a television camera tube of the above-described type the length of which is as small as possible.

According to the invention, a television camera tube having, centered along an axis, an electron gun having a cathode and an anode provided with an aperture for producing an electron beam and a focusing lens for focusing the electron beam on a photoconductive layer which is provided on a signal plate, on which photoconductive layer a potential distribution is formed by projecting on it an optical image, said signal plate supplying electric signals corresponding to said optical image by the scanning of the photo-conductive layer by the electron beam, said focusing lens comprising a first electrode, a second electrode and a third electrode, the second electrode being present between the first electrode and the third electrode, said anode forming part of the first electrode, is characterized in that the surface of the second electrode facing the electron beam has a mainly constant cross-section and that the surfaces of the first electrode and the third electrode facing the electron beam have cross-sections which widen in the direction of the second electrode.

Calculations of electron paths in all kinds of tested electrode configurations of the focusing lens of a television camera tube according to the invention have demonstrated that a focusing lens as described above can be constructed so as to be very short. Furthermore, the first and third electrode widening in the direction of the second electrode enable the field strength along the axis of the focusing lens, at the area of the narrowest cross-sections of the said electrodes, to be influenced so that diaphragms provided at that area exert an extremely small focusing or defocusing influence on the electron beam, and thus cause hardly any aberrations. It should be noted that the focal distance associated with a diaphragm is inversely proportional to the difference of the axial field strength on either side of the diaphragm. In order to reach that the diaphragm has no focusing or defocusing influence, the focal distance must be infinite. This can be approached either by making the field strengths on either side of the diaphragm both substantially zero by arranging the diaphragm in a long cylindrical electrode, as is done in the above known television camera tube, or by making the difference of said field strengths substantially zero by choosing the electrode configuration according to the invention.

A television camera tube according to the invention is preferably constructed so that the first electrode (anode) on the side remote from the second electrode comprises an aperture which restricts the cross-section of the electron beam.

As a result of this it is achieved that it is not necessary to reproduce a cross-over of the electron beam on the photoconductive layer by means of the focusing lens, but the said aperture in the first electrode which may be chosen to be very small is reproduced.

A favourable embodiment of a television camera tube according to the invention is such that the aperture in the first electrode on the side of the second electrode has a larger diameter than at the area of the narrowest cross-section.

This enables a very accurate influence of the field strength on the side of the aperture facing the second electrode, as a result of which aberrations are even better reduced.

A television camera tube according to the invention is preferably constructed so that the aperture in the first electrode comprises a substantially circular-cylindrical part on the side of the second electrode.

This provides a shape of an aperture which structurally is simple to realize and which enables the desirable configuration.

A favourable construction of a television camera tube according to the invention is such that the third electrode on the side remote from the second electrode comprises an aperture which restricts the cross-section of the electron beam.

By providing this aperture, which may have a much larger narrowest cross-section than the said aperture in the first electrodes, it is achieved that peripheral rays, which have aberrations which may have been caused in that the relevant electrons have started at a relatively large distance from the center of the cathode with such a direction that they could pass the narrow aperture all the same, cannot reach the photosensitive layer.

The aperture in the third electrode is preferably formed in the manner stated already for the aperture in the first electrode.

A device comprising a television camera tube according to the invention is preferably constructed so that the voltage at the third electrode is at least four times as large as the voltage at the first electrode.

This aspect of the invention is based on the discovery that the magnificiation M of an electron optical lens, is given by the formula:

$$M = b/v \quad \sqrt{V_1/V_2},$$

where $b$ is the picture distance, $v$ the object distance, $V_1$ the potential at the first electrode, and $V_2$ the potential at the last electrode. In order to obtain a good definition, $M$ is fixed and must be approximately 1.5 to 2. The picture distance and the object distance determine to a considerable extent the length of the television camera tube, and must hence be as small as possible. The picture distance is determined to a considerable extent by the length which is necessary for the deflection of the electron beam necessary for the scanning. In order to minimize the object distance, the ratio $V_1/V_2$ must hence be as small as possible.

The invention will now be described with reference to the accompanying drawing, in which.

Figure 1:
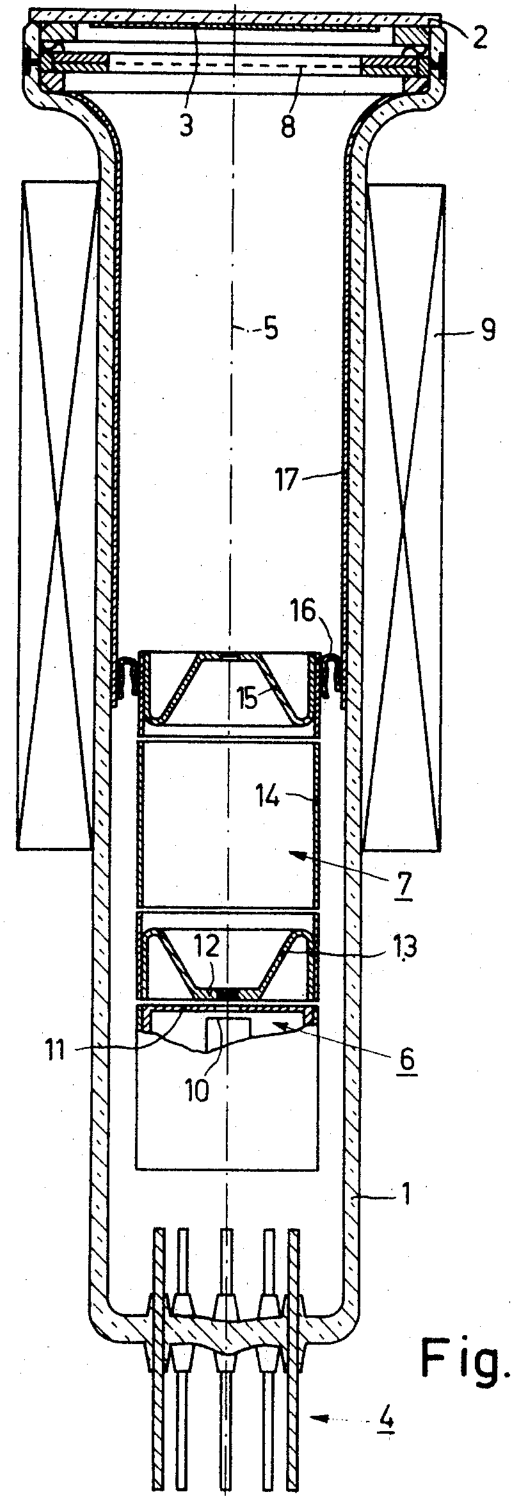
FIG. 1 shows a television camera tube according to the invention.

The camera tube shown in FIG. 1 is of the "Plumbicon" type and comprises a glass envelope 1 having on one side a face plate 2 on which a layer 3 is provided which consists of a photoconductive layer and a conductive transparent signal plate between the photoconductive layer and the face plate 2. The photoconductive layer consists mainly of specially activated lead monoxide and the signal plate of conductive tin dioxide. The connection pins 4 of the tube are present on the other side of the envelope 1, centered along an axis 5 the camera tube comprises an electron gun 6 and a focusing lens 7. The tube furthermore comprises a gauze electrode 8 to cause perpendicular landing of the electrons on the layer 3. A set of deflection coils 9 which are shown diagrammatically and which deflect the electron beam produced by the electron gun 6 into mutually perpendicular directions are arranged around the envelope 1. The electron gun 6 comprises a cathode 10, a grid 11 and an anode 12. The focusing lens 7 comprises a first electrode 13, a second electrode 14 and a third electrode 15. The third electrode 15 is connected to a conductive layer 17 on a part of the inside of the envelope 1 via a connection 16. The connection of the said components and their connection to the connection pins 4 are not shown in the Figure to avoid complexity of the drawing.

Figure 2:
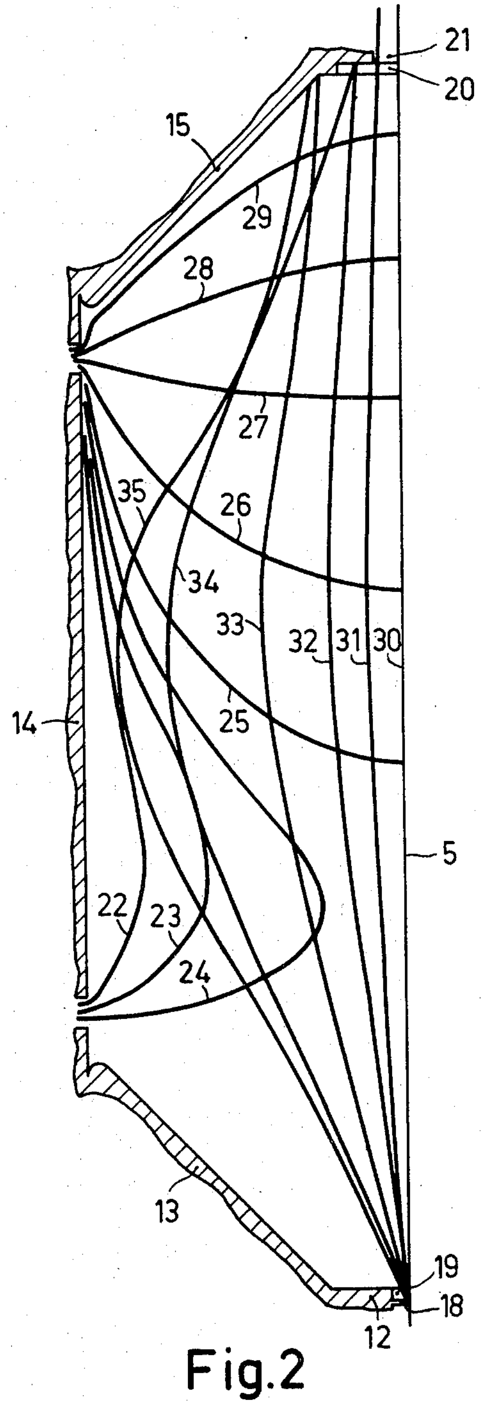
FIG. 2 shows diagrammatically the electrode configuration of the focusing lens of the tube shown in FIG. 1.

FIG. 2 shows the electrode configuration of the focusing lens which is used in the tube shown in FIG. 1 and is denoted in FIG. 1 by 7. Since the focusing lens is rotationally symmetrical, only the part of the configuration present on one side of the axis of symmetry is shown. The focusing lens comprises a first electrode 13 of which the anode 12 (see also FIG. 1) forms part, a second electrode 14 and a third electrode 15. The first electrode 13 has an aperture which comprises two cylindrical parts 18 and 19. The aperture 18 has a diameter of 0.020 mm and a length (along the axis 5) of 0.015 mm. The aperture 19 has a diameter of 0.300 mm and a length (along the axis 5) of 0.200 mm. The inside diameter of the cylindrical second electrode 14 is 10.5 mm as is the largest inside diameter of the first electrode 13 and the third electrode 15. The length of the electrodes, measured along the axis 5, are: first electrode 13: 4.5 mm, second electrode 14: 10.0 mm, third electrode 15: 4.5 mm. The third electrode 15 has an aperture which comprises two cylindrical parts 20 and 21. The aperture 20 has a diameter of 2.0 mm and a length (along the axis 5) of 0.200 mm. The aperture 21 has a diameter of 0.750 mm. The voltages at the electrodes relative to the cathode (10 of FIG. 1) are: first electrode 13: 50 volts; second electrode 14: 25 volts; third electrode 15: 500 volts. The Figure shows a few equipotential lines denoted by 22, 23, 24, 25, 26, 27, 28 and 29; the associated voltages are 30, 35, 40, 50, 100, 250, 400 and 480 volts, respectively. A few electron paths are denoted by 30, 31, 32, 33, 34 and 35 and start all of them in the center of the aperture 18 from the axis 5. The electron path 30 extends along the axis of the focusing lens. From the investigations from which FIG. 2 was derived it follows that electrons which start in a point 5 of the axis at none too large an angle with the axis 5 are focused at the distance in view beyond the aperture 21. In the Figure this is shown, for example, with the paths 31 and 32 and their elongations. Electrons starting at too large an angle with the axis, as is denoted, for example, by the paths 34 and 35, follow paths, however, which show abberations. It will be clear from the Figure that such paths which would form too large a spot on the photoconductive layer do not reach the photosensitive layer by a correct choice of the diameter of the aperture 21. It furthermore follows from the investigations that the field strength on the side of the second electrode of the aperture 21 is extremely small due to the influence of the aperture 20. The field strength on the other side of the aperture 21 is substantially zero, because an equipotential space is present there as a result of the conductive layer 17

(FIG. 1). It has been found that the aperture 21 can be represented by a thin lens having a focal distance of 120 mm which is very large relative to the dimensions of the focusing lens. As a result of this large focal distance the aperture 21 has a substantially no lens effect and thus causes substantially no aberrations. The aperture 19 is proportioned so that the field strengths on either side of the aperture 18 are substantially the same. As a result of this the influence of the aperture 18 is also represented by a very large focal distance, as a result of which the aperture 18 also causes substantially no aberrations. As a result of the large ratio between the voltages at the first electrode 13 and the second electrode 15, namely $500/50 = 10$, and as a result of the configuration of the electrodes as is shown in FIG. 2, a considerable reduction of the overall length of the television camera tube is obtained, relative to the known miniature construction which comprises a unipotential focusing lens. This follows from the already given formula $M = b/v \sqrt{V_1/V_2}$. In the known tube the distance between the cathode and the photoconductive layer is 78 mm and in the tube according to the invention it is 56 mm (28% shorter).

What is claimed is:

1. A television camera tube having, aligned along an axis, an electron gun having a cathode, a control grid and an anode provided with an aperture for producing an electron beam and a focusing lens for focusing the electron beam, a signal plate, a photoconductive layer on said signal plate on which a potential distribution is formed by projecting on it an optical image, means to scan said photoconductive layer with said electron beam to produce electrical signals corresponding to said optical image, said focusing lens comprising a first electrode having a truncated conical portion, said anode forming a part of said first electrode, a second electrode, and a third electrode having a truncated conical portion the wide end of which faces the wide end of the first electrode, the second electrode being positioned between the wide ends of the first and third electrodes and having a diameter substantially equal to the largest diameter of the truncated conical portions of the first and third electrodes, said first electrode comprising a substantially circular cylindrical part having an aperture with an area of minimum cross-section, and a substantially circular cylindrical part on the side of the second electrode, and said third electrode comprising a substantially circular part defining an aperture having an area of minimum cross-section on the side remote from the second electrode for restricting the cross-section of the electron beam, and a substantially circular cylindrical part on the side of the second electrode.

* * * * *